US010413998B2

(12) United States Patent
Marchione et al.

(10) Patent No.: US 10,413,998 B2
(45) Date of Patent: Sep. 17, 2019

(54) LASER SINTERING OF INTRICATE PARTS

(71) Applicant: Caterpillar Inc., Peoria, IL (US)

(72) Inventors: Thierry Marchione, Herber City, UT (US); Luis Vazquez, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 965 days.

(21) Appl. No.: 14/874,197

(22) Filed: Oct. 2, 2015

(65) Prior Publication Data
US 2017/0095887 A1  Apr. 6, 2017

(51) Int. Cl.
B23K 9/04 (2006.01)
B23K 26/342 (2014.01)
B22F 3/105 (2006.01)
B23P 6/00 (2006.01)
B22F 7/08 (2006.01)
B33Y 80/00 (2015.01)
B33Y 10/00 (2015.01)
B22F 5/10 (2006.01)

(52) U.S. Cl.
CPC .......... B23K 26/342 (2015.10); B22F 3/1055 (2013.01); B22F 7/08 (2013.01); B23P 6/00 (2013.01); B33Y 10/00 (2014.12); B33Y 80/00 (2014.12); B22F 5/10 (2013.01); B22F 2003/1058 (2013.01); Y02P 10/295 (2015.11)

(58) Field of Classification Search
CPC ............... B22F 3/1021; B22F 3/1055; B22F 2003/1056; B22F 2003/1058; B23K 26/342; B29C 64/153; B23P 6/00; B23P 6/04; B23P 6/045; B33Y 10/00; B33Y 30/00; B33Y 70/00; B33Y 80/00
See application file for complete search history.

(56) References Cited

U.S. PATENT DOCUMENTS

| 4,323,756 | A | 4/1982 | Brown et al. |
| 5,038,014 | A | 8/1991 | Pratt et al. |
| 2008/0182017 | A1 | 7/2008 | Singh et al. |
| 2011/0123794 | A1* | 5/2011 | Hiller ............... B29C 64/112 428/221 |
| 2013/0264750 | A1 | 10/2013 | Hofacker et al. |
| 2014/0163717 | A1 | 6/2014 | Das et al. |
| 2015/0093283 | A1* | 4/2015 | Miller ............... A61F 2/3859 419/55 |
| 2015/0360421 | A1* | 12/2015 | Burhop ............ G05B 19/4099 264/401 |
| 2016/0348570 | A1* | 12/2016 | Willi ................ F02B 19/18 |

FOREIGN PATENT DOCUMENTS

| EP | 2730354 A1 * | 5/2014 | ............ B22F 3/1055 |
| GB | 2517490 A * | 2/2015 | ............ B22F 3/1055 |

* cited by examiner

Primary Examiner — Dana Ross
Assistant Examiner — Brandon T Harvey
(74) Attorney, Agent, or Firm — Oblon, McClelland, Maier & Neustadt

(57) ABSTRACT

Additive manufacturing creates, repairs, or upgrades parts. Conventional manufacturing processes are used to prepare a body of the part and additive manufacturing processes are used to prepare intricate geometries of the part. A support structure is used to support the intricate features during the additive manufacturing processes. Particularly, laser sintering is used to create entire parts or to create a repaired or upgraded part by casting the body of the part and integrating the body with a build plate and using laser sintering to develop the intricate features necessary.

12 Claims, 8 Drawing Sheets

LASER SINTERING OF INTRICATE PARTS

TECHNICAL FIELD

This patent disclosure relates generally to additive manufacturing of intricate parts and, more particularly, to laser sintering using support structures.

BACKGROUND

Additive manufacturing processes, also known as 3D printing, have been used for prototyping components and small-scale manufacturing. In general, additive manufacturing processes create parts layer-by-layer instead of from a casting or mold. For example, polymers may be heated and extruded in a computer-controlled process to generate a component without relying on traditional thermoplastic injection molding techniques and systems. Another type of additive manufacturing process, laser sintering, involves the use of a laser to fuse a base powder into a form in a layer-by-layer process. The shape is determined by instructions provided in files generated using computer-aided design (CAD) tools, similar to traditional computer-aided manufacturing (CAM) processes. However, unlike many traditional CAM processes, which are sometimes referred to as "subtractive manufacturing," laser sintering remains costly and specialized. Laser sintering has, accordingly, not been integrated into manufacturing systems and processes, such as repair processes for intricate parts.

United States Patent Publication 20130264760 (US '760), "Method for Selective Laser Sintering and System for Selective Laser Sintering Suitable for Said Method," purports to address the problem of the use of using laser sintering for repairing parts. The US '760 publication describes removing damaged portions of parts to create recesses to be filled using laser sintering with a rotating powder distributor. The design of the US '760 publication, however, only discusses excising damaged portions of components and then replacing them using laser sintering, which may result in the inefficient use of laser sintering to repair damaged components where other processes may be used. US '760 is also silent on creating parts through efficient combinations of conventional manufacturing techniques and additive manufacturing methods such as laser sintering. Accordingly, there is a need for improved techniques of laser sintering manufacturing.

SUMMARY

In one aspect, the disclosure describes a method including preparing a build plate, integrating a core having a second and a first end with a body of a part, integrating the part with the build plate, providing a support structure on the first end of the core, and using an additive manufacturing process to generate a new portion of the body including an intricate feature which is supported by the support structure.

In another aspect, the disclosure describes a part including a hollow body prepared using a conventional manufacturing process, a core with a first end and a second end integrated with the body, the core including a support structure on its first end, and an intricate feature abutting the support structure, the intricate feature generated using an additive manufacturing process.

In yet another aspect, the disclosure describes a method including providing a component comprising a hollow body and a first intricate feature, integrating a core with a first end and a second end, removing the first intricate feature from the component, with the hollow body, removing the first intricate feature, generating a support structure on the first end of the internal support, and using a manufacturing process to generate a second intricate feature, supported by the support structure, at the location of the first intricate feature.

DETAILED DESCRIPTION

Figure 1:
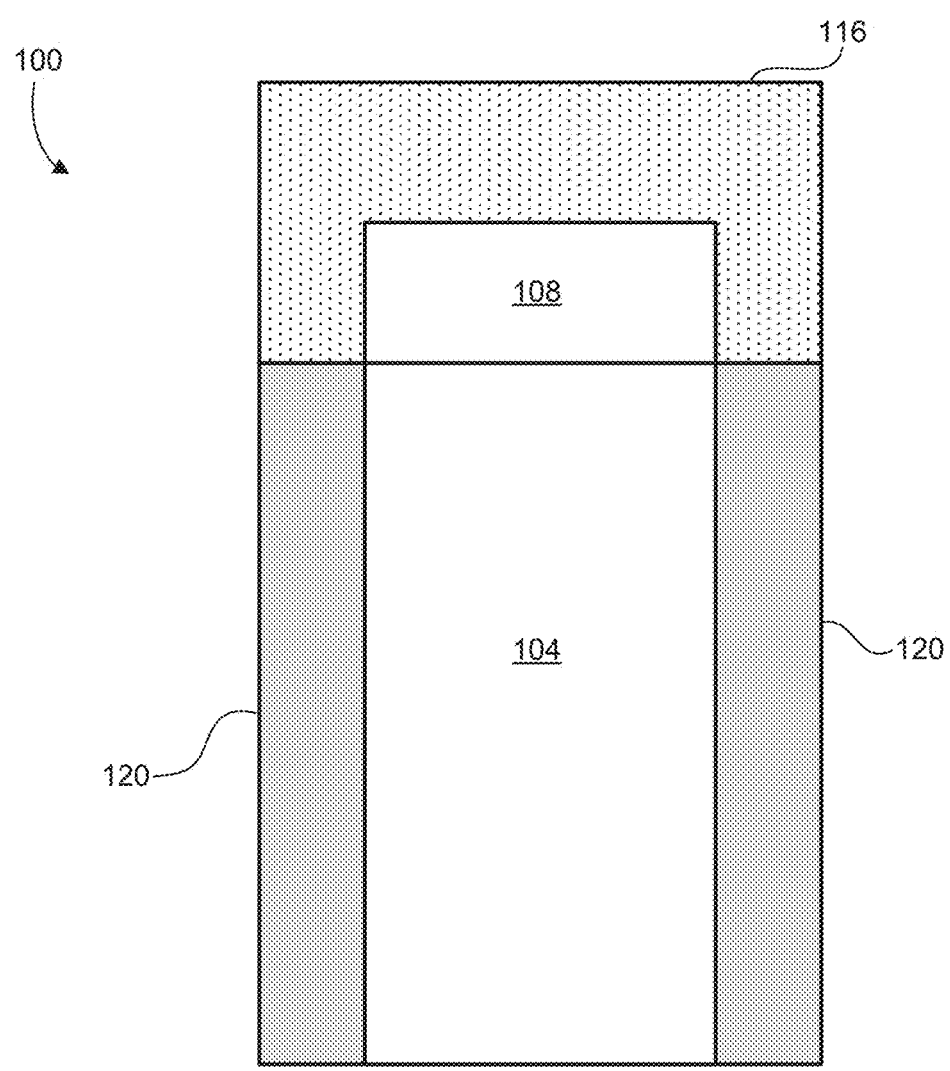
FIG. 1 is an illustrative diagram of a cutaway side view of a part with an internal core, support structure, and a feature produced by an additive manufacturing process.

Now referring to the drawings, wherein like reference numbers refer to like elements, there is illustrated in FIG. 1 a diagram of a cutaway side view of multiform part 100. Multiform part 100 may be, for example, a part or component of a device or system or may be a device unto itself. Multiform part 100 may be generated or formed through multiple processes or types of processes. For example, one or more conventional manufacturing processes and one or more additive manufacturing processes. Multiform part 100 includes internal core 104, support structure 108, part body 120, and intricate feature 116. Multiform part 100 may be a part with a body (part body 120) and an intricate feature (intricate feature 116). Part body 120 may already be formed and intricate feature 116 may have be absent—yet to be created. For example, part body 120 may be generated using a non-additive (which may also be described as "subtractive") manufacturing process, herein referred to as a "conventional" manufacturing process. Intricate feature 116 may be created using an additive manufacturing process and the creation of intricate feature 116 may be facilitated or assisted by internal core 104 and support structure 108. For example, internal core 104 may be inside part body 120 and internal core 104 may provide a platform or base for support structure 108. Support structure 108 may provide support for the creation of intricate feature 116. This support may be, for example, structural support and may reduce, eliminate, counteract, or offset stresses placed on intricate feature 116 as it is being constructed and after it is formed.

In this aspect, multiform part 100 may be generated using at least one conventional manufacturing process and at least one additive manufacturing process. Part body 120 may, for example, be created using a conventional manufacturing process. Part body 120 may, as a result of the conventional manufacturing process, be already prepared to be integrated with internal core 104. In an aspect, part body 120 is a hollow structure, such as a hollow cylinder. Support structure 108 may already exist on internal core 104 or may be formed on internal core 104, by, for example, an additive manufacturing process. Intricate feature 116 may then be formed utilizing support structure 108. This may be accomplished by, for example, by forming intricate feature 116 using an additive manufacturing process.

If intricate feature 116 has yet to be created, then multiform part 100 includes part body 120 but does not include intricate feature 116 until intricate feature 116 is created. Internal core 104 may be a structure within part body 120 which may not be included in the part itself. For example, internal core 104 may be inserted into part body 120 to provide support to part body 120 during a manufacturing process. Internal core 104 may have varying geometries and dimensions and have various surface characteristics. For example, internal core 104 may be partially or entirely cylindrical, conical, pyramidal, cuboid, lemniscatoid, or comprise a polygonal prism (such as a triangular or hexagonal prism). Internal core 104 may have one or more external features such as knurling or threading, and may include such features on sections of internal core 104 or across the entire external surface of internal core 104. For example, internal core 104 may be cylindrical and its two ends may be smooth while the body of internal core 104 may have sections of knurling. An end of internal core 104 may have an adapter, socket, or cavity of some type, such as a countersink or counterbore, for accepting a tool or mount.

Internal core 104 may also serve as a base for support structure 108. Support structure 108 my serve as a superstructure formed on internal core 104 to support intricate feature 116 during a manufacturing process, such as an additive manufacturing process. For example, part body 120 may be fabricated using a conventional (non-additive or "subtractive") technique such as casting and may be intended to be a body for a part that also includes an intricate feature. The conventional technique used to fabricate part body 120 may be, for example, inefficient, unreliable, or unsuitable for the fabrication of intricate feature 116. An additive manufacturing technique may be used to fabricate intricate feature 116. To fabricate intricate feature 116, a supporting structure may be necessary.

Figure 2:
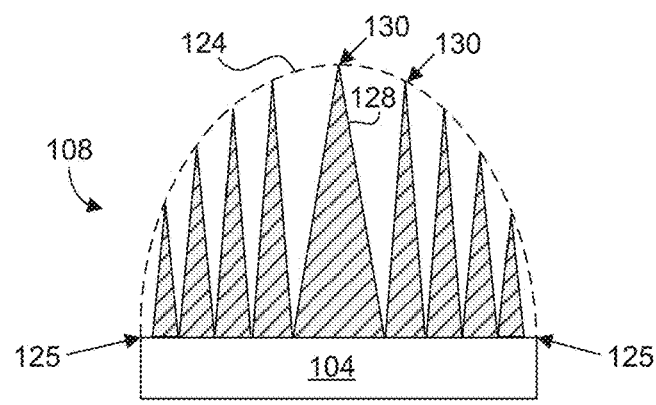
FIG. 2 is an illustrative diagram of a cutaway side view of a build plate integrating a part to undergo an additive manufacturing process.
Figure 3:
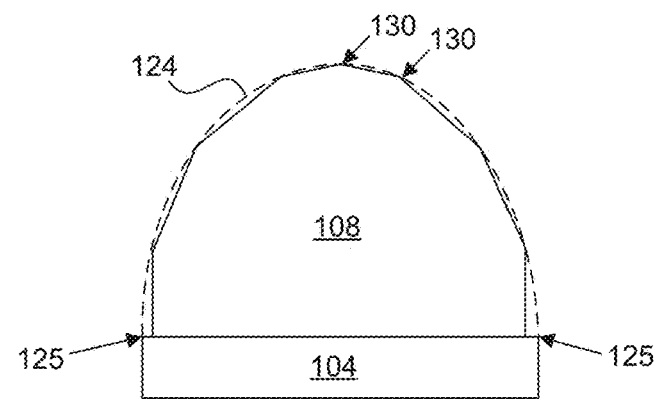
FIG. 3 is an illustrative cutaway side view of a part after the generation of intricate parts using additive manufacturing.
Figure 4:
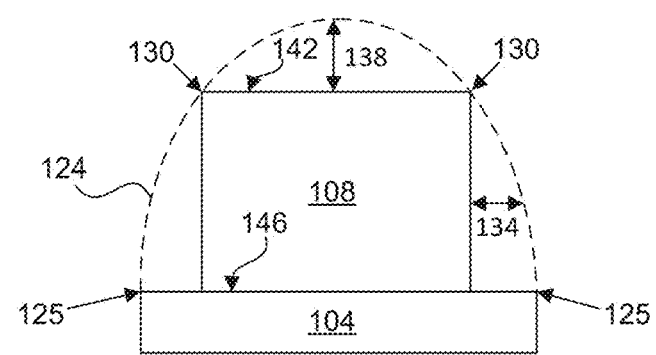
FIG. 4 is a flowchart for an exemplary method of generating intricate part features using additive manufacturing.

FIGS. 2-4 illustrate cutaway side views of examples of support structure 108 according to aspects of the disclosure. In FIG. 2, support structure 108 is shown with a dashed line representing an example of surface 124 of intricate feature 116. Points of contact 130 between surface 124 and support structure 108 may allow for surface 124 to be formed by preventing or offsetting forces which may prevent surface 124 from forming, either in whole or in part, and forces which may have or cause an undesirable or adverse impact on surface 124, such as, for example, warping or otherwise preventing proper formation of intricate feature 116. Non-limiting examples of these forces may include environmental forces such as gravity and atmospheric pressure, forces from the additive manufacturing process, such as heat, and structural stresses. For example, structural stresses may change as the loads placed on surface 124 may change as each layer is added to it during an additive manufacturing process. As another example, tools used in additive manufacturing processes, such as scrapers and rollers, may place direct and indirect stresses on surface 124 and the corresponding intricate feature 116 during and after its formation.

Surface 124 may be an internal surface of intricate feature 116, for example, where intricate feature 116 is a hollow or chambered structure. Intricate feature 116 may, for example, have openings or discontinuities. Openings may be, for example, circular, ovoid, elliptical, or other shapes and configurations or combinations of one or more shapes and configurations. This may facilitate, for example, the flow (laminar or turbulent) of a fluid. The fluid may be, for example, a gas, a liquid, particulate matter, or a combination of one or more gases, liquids, and particulate matter, such as an aerosol. Surface 124 may extend down to the edge of internal core 104 and may or may not overlap with internal core 104, such as at interface 125. Interface 125 may be defined, for example, by an edge of part body 120 (as shown in FIG. 1), an edge of internal core 104, and surface 124. Such overlap may occur, for example, during formation of surface 124. The overlap of surface 124 and internal core 104 may be incidental and overlap may be removable without affecting the structure of surface 124.

Support structure 108 as shown in FIG. 2 includes spikes such as support spike 128. The spikes forming support structure 108 may be of uniform or uneven size, and the dimensions of the spikes may be in accordance with the particular geometric and material characteristics of surface 124. Spikes, such as support spike 128, may be, for example, conical or pyramidal or substantially conical or pyramidal. The base of support spike 128 may have, for example, a two- or three-dimensional polygonal geometric configuration. The number of spikes shown is exemplary and fewer or more spikes may be utilized, even, for example, a single spike. Spacing between spikes may be defined, for example, as between the bases of spikes, the bodies of the spikes at any point along the body, or between tips of spikes (straight-line distance or distance between the tips as traversed on surface 124). The tip of the spike (or end of the spike opposite the base) is in contact with surface 124. With the tip of the spike abutting surface 124, support may be provided to intricate feature 116 as it is formed or after it is formed.

In FIG. 3, support structure 108 is illustrated as a single body with points of contact 130 with surface 124. Support structure 108 may be a solid or hollow body, for example, and may have cavities, recesses, depressions, or other features which may assist in providing support for surface 124. The angles between points of contact 130 may be uniform or may vary and the spacing between points of contact 130 may be uniform or may vary. For example, surface 124 may be a dome or ogive, and points of contact 130 may be closer in proximity at the apex or peak of the dome and further apart toward the base of the dome (closer to interface 125), or vice-versa.

The number of points of contact 130 shown is an example and may vary. Additionally, points of contact 130 are not limited to a tip or a meeting point of a set of edges. Points of contact 130 may be, for example, an edge, curve, gradient, or surface of support structure 108 with continuous or discontinuous contact with surface 124. For example, points of contact 130 may include a flat or substantially flat surface of support structure 108 with contact with surface 124 extending along a plane of the surface. Points of contact 130 may be chamfered or beveled. Points of contact 130 may be intentionally or unintentionally joined to, bond with, adhere to, fuse with, or otherwise become connected with surface 124. This may occur when surface 124 and intricate feature 116 in general are formed during additive manufacturing processes. Support structure 108 may be breakable at points of contact 130 or anywhere along the body of support structure 108. For example, a break may be between support structure 108 and surface 124, support structure 108 and internal core 104, or of support structure 108 itself. For example, support structure 108 may be breakable under the force of a tool. Such a tool may be, for example, a tool operable by direct mechanical interaction by a person, such as a hand tool. Such a hand tool may be, for example, powered or unpowered, and may be one or more of a wrench, a lever, pliers, a hammer, a screwdriver, or other tools.

In FIG. 4, support structure 108 is illustrated as a single body with points of contact 130 with surface 124. While support structure 108 is a single body as shown, support structure 108 may, for example, be solid, hollow, partially hollow/solid, or have a partially or fully latticed structure. Points of contact 130 as shown in FIG. 4 may be parallel. In an aspect, a straight or substantially straight line defined by surface 142 of support structure 108 may connect points of contact 130, and surface 142 may be parallel or substantially parallel with a surface of internal core 104, such as surface 146. Support structure may have clearances between its surfaces, such as clearance 134 and 138, and surface 124. Clearance 134 and 138, may be, for example, equivalent in size or different in size.

In any of FIGS. 2-4, the geometry and dimensional relationships are nonlimiting examples and do not represent a required or necessary configuration of support structure 108. Additional and alternative support structures 108 may include a combination of two or more of the geometries of support structure 108 as shown in FIGS. 2-4. In another aspect, none of the illustrative support structures 108 of FIGS. 2-4 may be included in support structure 108. It is further contemplated that support structure 108 may include one or more materials which may or may not be the same or the same type of material as surface 124 and intricate feature 116.

Returning to FIG. 1, part body 120 is not limited by any particular geometry or dimensions. Part body 120 may be, for example, substantially cylindrical, cubic, spheroidal, pyramidal, trapezoidal, or any combination of these exemplary geometries. Part body 120 may have one or more cavities of varying or uniform volumes. Geometric aspects and cavities may be part of the intended ultimate design for part body 120 or may be temporary. For example, part body 120 may have a particular cavity for the integration of internal core 104. This cavity may be later modified or eliminated by additional processes, or it may be part of the intended and ultimate design of a component including part body 120. Part body 120 is not limited to a particular material or material type. Part body 120 may be, for example, a metal, such as a nickel-based alloy, titanium, steel, or aluminum. Part body 120 may be, for example, a removable and independently transportable component of a device or system. In an aspect, part body 120 may be a hollow, thin-walled component. For example, part body 120 may have a thickness of less than 0.5 mm.

Internal core 104 may be of the same material or material type as part body 120 or of a different material or material type. For example, part body 120 may be a metal and internal core 104 may be a ceramic. Internal core 104 may have a geometry matching that of part body 120 or differing. For example, part body 120 may be cylindrical and internal core 104 may also be cylindrical, but with a slightly smaller diameter to allow internal core 104 to fit inside part body 120. As another example, part body 120 may be cylindrical and internal core 104 may be a hexagonal prism.

Support structure 108 is not limited in its geometry or configuration. Support structure 108 may be a lattice structure and may be highly rigid. For example, support structure 108 may be a lattice structure characterized by, for example, hexagonal tiling or other polygonal tiling. In an aspect, support structure 108 may include several "spike" structures, for example, as illustrated in FIG. 3. Spike structures may be defined, for example, by a base having a certain shape (such as a circle or a polygon) with a tapering column extending from the base. Spike structures may allow for easier disengagement of intricate feature 116 from support structure 108 by breaking under rotational forces, but still provide resistance to downward mechanical pressure. Support structure 108 may have geometry suitable for supporting the additive manufacturing process used for intricate feature 116. For example, force applied (such as by a roller or scraper) to very thin or brittle structures being formed by additive manufacturing may result in the structures bending, cracking, deforming, or breaking Support structure 108 provides support for intricate feature 116 to resist such forces. Support structure 108 may be generated by an additive manufacturing process, which may be the same as or different from the additive process used for intricate feature 116. Support structure 108 may be formed directly on an end surface of internal core 104 or, for example, may be formed separately and transferred to a surface of internal core 104. In an aspect, support structure 108 may be formed on a mount, plate, or other surface, and that surface then connected with internal core 104.

Intricate feature 116 may be created, for example, from a preexisting part of a component which includes part body 120, or it may be created, for example, entirely new as an addition to or additional portion of part body 120. For example, where a new component is being created, part body 120 may be created by a casting process. Intricate feature 116 may have intricate geometries, such as numerous precise grooves less than 300 microns in diameter. Features of varying detail at a miniatures scale may provide intricate geometries. These features may include, for example, a groove, channel, orifice, lattice, rib, or combinations of such features. For example, a channel may split into one or more orifices. Additionally, as another example, intricate features may include features defined by splines, such as splines implemented in CAD tools to generate drawings. These intricate features may be unsuitable for or incapable of being produced by conventional manufacturing techniques. An unsuitable process may, for example, produce components with the features outside of tolerance, partially or wholly inoperable, or be able to produce the features but without consistency.

Figure 5:
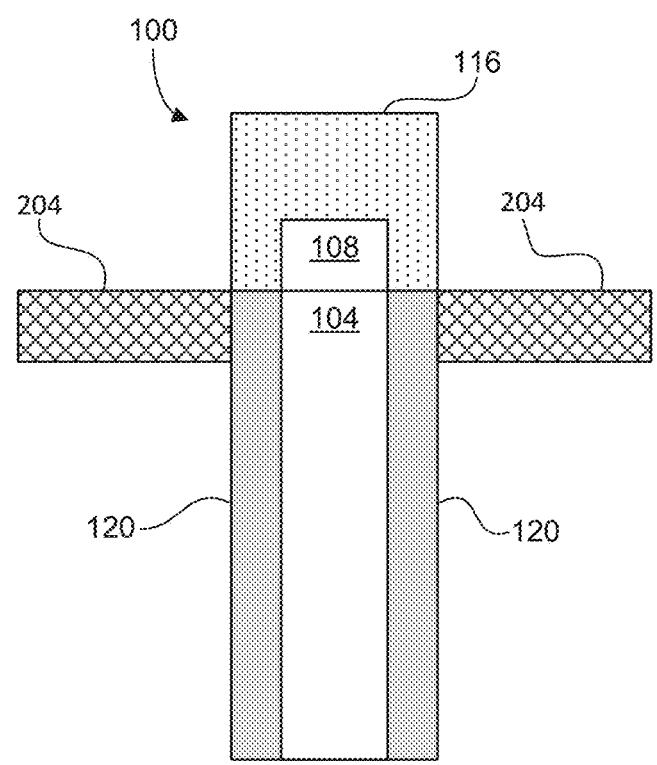
FIG. 5 is an illustrative diagram of an exemplary fuel injector nozzle.

FIG. 5 illustrates an exemplary diagram of a cutaway side view of multiform part 100 integrated into build plate 204. Build plate 204 may be a build plate for an additive manufacturing device. Build plate 204 may be a surface, such as a platform, upon which components are formed using additive manufacturing processes. A spatial position of build plate 204 may be manipulated as part of the additive manufacturing process. For example, the build plate may be lowered as a part is being formed. The spatial manipulation of build plate 204 may facilitate a layer-by-layer formation of a part. For example, build plate 204 may be a build plate for a laser sintering device. Build plate 204 may be placed in an additive manufacturing device's build chamber. For example, in a laser sintering device, a base powder may then be distributed across build plate 204 and melted by a laser. Layers of powder may have varying thickness. For example, a layer of a metallic powder may have a thickness of 10-30 microns. Build plate 204 may be spatially manipulated, such as by lowering build plate 204 relative to the plane on which the laser sintering is taking place, to allow for an un-sintered layer of metallic powder to be sintered such that it adds (at least in part) to the vertical structure of part (and may also add to the part in other dimensions) when the powder is melted and fused with the already heated layer or layers (which have been fused if multiple layers have already been through the process).

Multiform part 100 and build plate 204 may be integrated, for example, using a slipping interface. The slipping interface may be, for example, between a port or opening in the build plate and an exterior surface of multiform part 100. The opening or port in build plate 204 may surround a corresponding section of the exterior of multiform part 100, such as, for example, circumferentially. Multiform part 100 and build plate 204 may also be integrated, for example, by fusing multiform part 100 and build plate 204. Fusing may be achieved, for example, by heating build plate 204. Build plate 204 and multiform part 100 may also be integrated using an interference fit. This may be achieved, for example, by heating build plate 204, causing build plate 204 or multiform part 100 to expand against the corresponding mating part. As another example, ambient temperature may be raised for build plate 204 and multiform part 100.

One or more multiform parts 100 may be integrated with build plate 204. For example, a set of multiform parts 100 which are new components being prepared and are ready for an additive manufacturing process to add an intricate process may all be integrated with build plate 204. In this aspect, build plate 204 may be integrated with multiple multiform parts 100. Where multiple multiform parts 100 are integrated with build plate 204, they may be spaced evenly or with varying amounts of surface area of build plate 204 separating multiform parts 100. Arrangement and configuration of multiform parts 100 in build plate 204 may depend, for example, on the particular additive manufacturing process or processes being utilized and the geometry of multiform parts 100. Arrangement and configuration of multiform parts 100 in build plate 204 may also depend on time (more multiform parts 100 may require additional process time) and capacity concerns. For example, a build chamber of an additive manufacturing device may only be able to accommodate build plate 204 of certain dimensions. Those dimensions may only be able to accommodate a certain number of multiform parts 100.

During additive manufacturing processes, overlap may occur between build plate 204 and multiform part 100. This overlap may join multiform part 100 to build plate 204. This bond may be broken by applying mechanical force to multiform part 100 or build plate 204 or both. For example, applying torque to multiform part 100 in the direction of the build of the additive manufacturing process which created the overlap may extract multiform part 100 from build plate 204. A cutting tool may also be sued to separate multiform part 100 from build plate 204.

Figure 6:
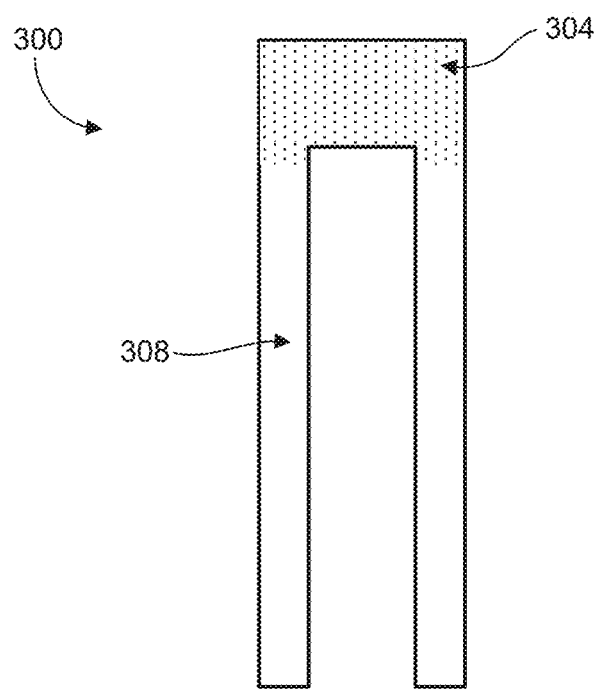
FIG. 6 is an illustrative diagram of a cutaway side view of an exemplary fuel injector nozzle with an internal core and support structure.

FIG. 6 illustrates an exemplary part 300. Part 300 may be multiform part 100 after removal from build plate 204, internal core 104, and support structure 108, after an additive manufacturing process produces intricate feature 116. Region 304 of part 300 may correspond to intricate feature 116 produced by the additive manufacturing process. Body 308 of part 300 may correspond to part body 120. In this manner, intricate feature 116 has been integrated with part body 120 by the additive manufacturing process to produce part 300.

Figure 7:
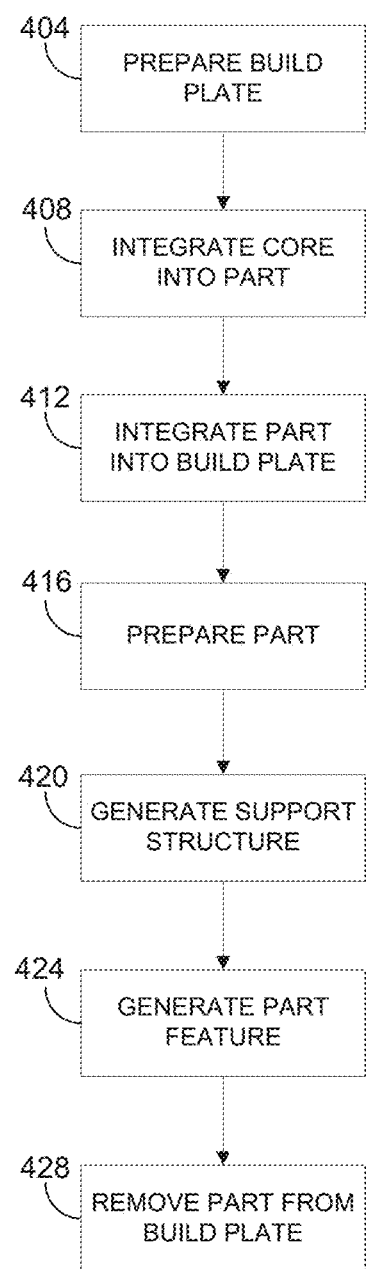
FIG. 7 is a flowchart for an exemplary method of generating intricate part features using additive manufacturing.

FIG. 7 is a flowchart of an exemplary method of generating intricate part features using additive manufacturing. At 404, build plate 204 is prepared. Preparation of build plate 204 may include, for example, sizing or resizing of openings and mating surfaces, heating or cooling build plate 204, and removing any residue (such as powder or sintered powder) from previous usage. At 408, internal core 104 is integrated into part body 120. At 412, part body 120 with internal core 104 is integrated into build plate 204. At 416, part body 120 is prepared. Preparation may include, for example, removing damaged regions. In another example, preparation may be testing the fit of part body 120 with build plate 204. As another example, for the generation of new components, part body 120 may be prepared using conventional methods such as casting. In this aspect, casted part body 120 may be checked for flash or other irregularities, particularly in the region where the additive manufacturing process will be employed. Flash or other irregularities may be addressed through pretreatment processes such as trimming. At 420, support structure 108 is generated. At 424, intricate feature 116 is generated. Intricate feature 116 may be generated, for example, by laser sintering. A metal powder, for example, may be dispersed over support structure 108. Dispersal may be achieved, for example, by tools such as a blade or scraper. A roller may then move back over the dispersed powder to compress the powder on the surface of support plate 204, part body 120 (such as where it is level with support plate 204), support structure 108, and internal core 104 (such as where it is level with support plate 204 and not covered by support structure 108). A laser, such as an yttrium or carbon dioxide laser, then is used to sinter the powder, which may already have been preheated. At 428, part 300 is removed from support plate 204. Build plate 204 may need to be removed from a chamber of the additive manufacturing device used in order to separate part 300 from build plate 204. At 204, part 300 may also be disengaged from internal core 104 and support structure 108. Removal may be accomplished, for example, by applying mechanical force to part 300 or build plate 204. Mechanical force may be translational force, such as rotational force. Force applied to disengage part 300 from build plate 204 and internal core 104 may come from a tool which may be connected with, engaged with, or interfaced with internal core 104. In an aspect, magnets may be used to remove part 300 from build plate 204 and disengage internal core 104 and support structure 108 from part 300. In another aspect, internal core 104 may have a male or female adapter which is mated to a corresponding male or female adapter of a tool. With internal core 104 secured to the tool, the tool may then apply force to internal core 104 resulting in any connections or bonds between internal core 104 or support structure 108 with part 300 to be broken and allowing separation.

Figure 8:
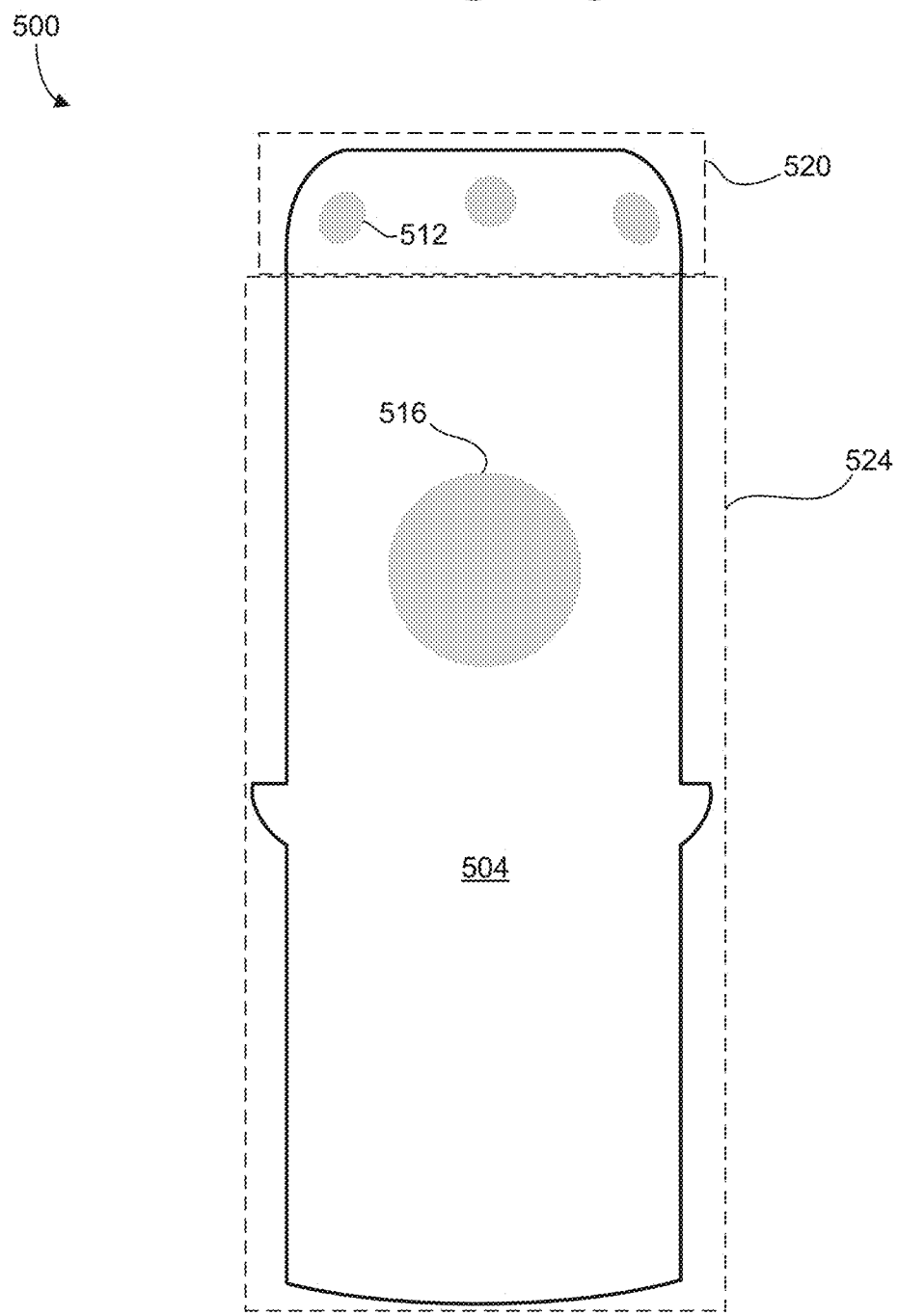
FIG. 8 is an illustrative side view of a fuel injector nozzle.

FIG. 8 is an illustrative diagram of exemplary fuel injector nozzle 500. Fuel injector nozzle may have a main body 504 with one or more orifices 512 and opening 516. Opening 516 may be, for example, a fuel inlet or fuel return. Exemplary fuel injector nozzle 500 may be divided into additive region 520 and conventional region 524. Additive region 520 may be designated to be prepared or subject to an additive manufacturing process whereas conventional region 524 may be designed to be prepared or subject to a conventional manufacturing process. For example, conventional region 524 of fuel injector nozzle 500 may be prepared using a conventional manufacturing process, such as casting, whereas additive region 520 may be prepared using an additive manufacturing process, such as laser sintering. By relation to FIG. 1, additive region 520 may be analogous to intricate feature 116 and conventional region 524 may be part body 120. In one aspect, a repair to fuel injector nozzle 500 may be necessary in additive region 520. In this aspect, an additive manufacturing process, such as laser sintering, may be used to repair an existing fuel injector nozzle rather than being used to create a new piece.

Figure 9:
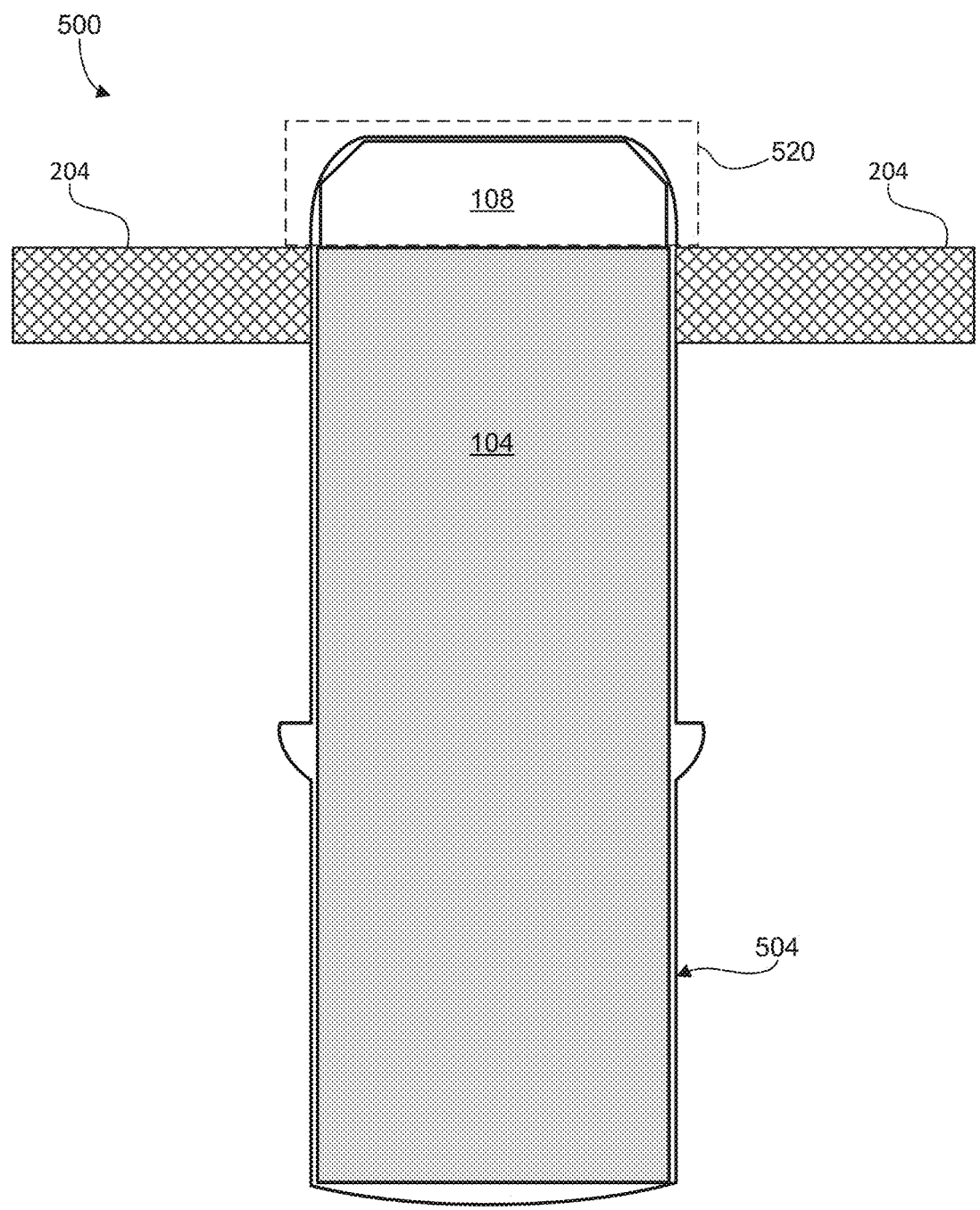
FIG. 9 is an illustrative cutaway side view of the exemplary fuel injector nozzle of FIG. 8 as it may be prepared using the exemplary method of FIG. 7.

FIG. 9 is an illustrative cutaway diagram of exemplary fuel injector nozzle 500 as it may be prepared, such as, for example, according to the method of FIG. 7. Main body 504 may be mated with build plate 204 by a slipping interface. Support structure 108 may be generated by an additive manufacturing process or preexisting as part of internal core 104.

For example, the part of fuel injector nozzle 500 in additive region 520 may be removed using a cutting or machining process. Support structure 108 may then, if not already existent, be created using an additive manufacturing process. After support structure 108 has been generated, the geometry of fuel injector nozzle 500 in additive region 520 may be generated. This may be part of, for example, a repair process or upgrade process. A repair process may seek to, for example, replicate the original geometry of additive region 520 of fuel injector nozzle 500. An upgrade process, however, may seek to introduce changes to the geometry of additive region 520. This may be to achieve, for example, new structures which were not possible given the original manufacturing process which originally generated fuel injector nozzle 500. As another example, an upgrade make seek to introduce new or alternative functionality to fuel injector nozzle 500. For example, orifices 512 may be originally include circular openings. It may be desired to change orifices 512 to have a different shape, or for orifices 512 to be oriented at different angles. A flowchart of an example of such a repair or upgrade process is shown in FIG. 10.

Figure 10:
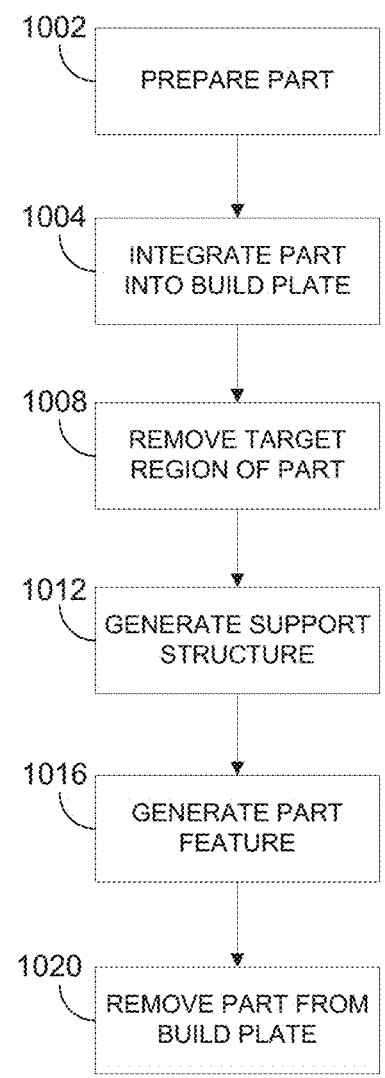
FIG. 10 is a flowchart for an exemplary method of generating intricate part features using additive manufacturing.

FIG. 10 is a flowchart of an exemplary method of repairing or upgrading a part utilizing an additive manufacturing process. At 1002, a part may be prepared for a repair or upgrade by, for example, removing it from its working environment and testing its function. For example, by reference to FIG. 9, fuel injector nozzle 500 may be removed from an engine and its throughput tested independent of other fuel injectors. This may occur, for example, as a result of engine issues such as reduced power output, stuttering, misfiring, and increased fuel consumption. Independent of or as a result of inspection and testing, fuel injector nozzle 500 may be prepared by marking the target region of the part to be repaired or upgraded. Marking may include, for example, drawing using writing instruments, and may also include, for example, scoring and creating guides. By reference to FIG. 9, fuel injector nozzle 500 may be marked, for example, along the boundary of main body 504 and additive region 520.

At 1004, by reference to FIG. 9, fuel injector nozzle 500 is integrated with build plate 204. At 1008, the section of fuel injector nozzle 500 within additive region 520 may be removed. Removal may also be accomplished prior to 1004. Removal may include, for example, cutting, abrading, grinding, or melting the section of fuel injector nozzle 500 within additive region 520. The removal process may use build plate 204 as a guide. For example, anything above the plane formed by a surface of build plate 204 may be removed. In one aspect, a cutting implement may be aligned with the surface of build plate 204 and moved across the surface of build plate 204. At 1004 or 1008, internal core 104 may be inserted into main body 504. At 1012, support structure 108 is generated on internal core 104 using, for example, an additive manufacturing process. Support structure 108 may be pre-generated on internal core 104 such that at the time of integration of internal core 104 with main body 504, support structure 108 has already been formed on internal core 104. At 1016, intricate feature 116 is generated using an additive manufacturing process. The additive manufacturing processes used to generate support structure 108 and intricate feature 116 may be the same type or different types of processes. The generation of intricate feature 116 at 1016 may utilize support structure 108 for support. By reference to FIG. 8, intricate feature 116 may include orifices 512. At 1020, fuel injector nozzle 500 is removed from build plate 204. Removal may also include separation of internal core 104 and support structure 108 from fuel injector nozzle 500.

INDUSTRIAL APPLICABILITY

The present disclosure is applicable to fabricating and remanufacturing components. Additive manufacturing techniques and systems as disclosed such as laser sintering systems and techniques provide cost savings and increased efficiency by utilizing laser sintering for only those features or regions where it is necessary or desirable. This provides desirable efficiencies when a component is initially manufactured by avoiding unnecessary use of laser sintering for features or parts of the component which may be prepared using less expensive, conventional processes. These efficiencies also arise in the context of repair. If a component is damaged, the entirety of the damage does not necessarily need to be repaired using laser sintering. The damaged regions may be repaired using conventional processes except for the technologically justified regions. Further efficiencies arise in the context of upgrades. If a particular feature or part is to be upgraded, the upgrade may be performed using conventional processes up to the element or elements of the feature which call for laser sintering.

Furthermore, additive manufacturing processes may allow for the creation of certain features not achievable using conventional manufacturing or industrial processes such as casting or machining Conventional manufacturing processes cannot achieve many miniature and detailed features, or cannot achieve such features with any acceptable reliability. Accordingly, It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. A method comprising:
   preparing a build plate;

integrating a core with a body of an existing part, wherein the core has a first end and a second end;

integrating the existing part with the build plate;

providing a support structure on the first end of the core; and generating, using a first additive manufacturing process, a new portion of the body on the existing part, wherein the new portion comprises a feature and is directly supported by the support structure, and wherein the new portion is further directly supported by the body of the existing part.

2. The method of claim 1, further comprising separating, using a rotational force, the existing part from the build plate.

3. The method of claim 1, wherein the body comprises a hollow cylinder.

4. The method of claim 1, wherein the core comprises a hexagonal prism.

5. The method of claim 1, wherein the new portion defines at least one of a groove, a channel, or an orifice.

6. The method of claim 1, further comprising removing, using a rotational force, the core from the body of the existing part.

7. The method of claim 1, wherein said providing the support structure includes generating a support structure using a second additive manufacturing process.

8. The method of claim 1, wherein the support structure comprises a conical structure, the conical structure comprising a base with a first diameter connected with the first end of the core and further comprising a tapering body extending from the base to point comprising a second diameter abutting the intricate feature.

9. The method of claim 1, wherein said providing the support structure includes generating the support structure prior to said generating the feature during the first additive manufacturing process.

10. The method of claim 1, wherein said providing the support structure on the first end of the core is such that the support structure covers less than an entire surface area of the first end of the core.

11. The method of claim 10, wherein the new portion is further directly supported by an exposed portion of the first end of the core not covered by the support structure.

12. The method of claim 1, wherein the existing part is an existing non-additive manufactured part.

\* \* \* \* \*